US006818147B2

(12) United States Patent
Wenderoth et al.

(10) Patent No.: US 6,818,147 B2
(45) Date of Patent: Nov. 16, 2004

(54) ANTIFREEZE CONCENTRATE CONTAINING THE COLORANT C.I. REACTIVE VIOLET 5

(75) Inventors: Bernd Wenderoth, Birkenau (DE); Ladislaus Meszaros, Mutterstadt (DE); Uwe Nitzschke, Ludwigshafen (DE); Stefan Dambach, Hassloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/473,807

(22) PCT Filed: May 2, 2002

(86) PCT No.: PCT/EP02/04784

§ 371 (c)(1),
(2), (4) Date: Oct. 2, 2003

(87) PCT Pub. No.: WO02/090462

PCT Pub. Date: Nov. 14, 2002

(65) Prior Publication Data

US 2004/0119044 A1 Jun. 24, 2004

(30) Foreign Application Priority Data

May 10, 2001 (DE) .......................................... 101 22 769

(51) Int. Cl.$^7$ .................................................. C09K 5/00
(52) U.S. Cl. ............................. 252/73; 252/75; 252/77; 252/78.1; 252/78.3; 8/543; 8/650; 8/675
(58) Field of Search .............................. 252/73, 75, 77, 252/78.3; 8/543, 650, 675

(56) References Cited

U.S. PATENT DOCUMENTS 5,723,060 A    3/1998   Bruhnke et al.

FOREIGN PATENT DOCUMENTS

EP          0 864 616       9/1998

*Primary Examiner*—Necholus Ogden
(74) *Attorney, Agent, or Firm*—Nixon & Vanderhye P.C.

(57) ABSTRACT

Antifreeze concentrates based on alkylene glycols or derivatives thereof or on glycerol, comprising from 0.0005 to 0.1% by weight of the dye C.I. Reactive Violet 5 (Color Index No. 18097), based on the total amount of the concentrate.

13 Claims, No Drawings

ANTIFREEZE CONCENTRATE CONTAINING THE COLORANT C.I. REACTIVE VIOLET 5

This application is the US national phase of international application PCT/EP02/04784 filed 2 May 2002 which designated the U.S.

The present invention relates to novel antifreeze concentrates based on alkylene glycols or derivatives thereof or on glycerol, comprising, as dye, Colour Index ("C.I.") Reactive Violet 5 (Colour Index No. 18097). The present invention furthermore relates to ready-to-use aqueous coolant compositions which comprise said antifreeze concentrates. The present invention also relates to the use of these antifreeze concentrates for the preparation of aqueous coolant compositions for internal-combustion engines.

Antifreeze concentrates for the cooling systems of internal-combustion engines, for example in automobiles, usually comprise alkylene glycols, especially ethylene glycol or propylene glycol, as the principal component. For use in the cooling system, they are diluted with water and are intended to ensure good heat dissipation as well as provide protection against freezing.

Alkylene glycol/water mixtures are very corrosive at the operating temperatures of internal-combustion engines. For this reason, the various metals, such as steel, cast iron, copper, brass, aluminum, magnesium and alloys thereof, as well as solder metals, for example solder tin, which are used in the cooling system have to be adequately protected against a very wide variety of types of corrosion, for example pitting corrosion, crevice corrosion, erosion or cavitation, through the use of corrosion inhibitors.

Antifreeze concentrates and radiator protection compositions are almost always colored by addition of a dye in order to prevent confusion with other functional fluids in motor vehicles, for example screen wash or brake fluids. The coloring is also intended to be recognizable during and after use in the cooling system.

Radiator protection compositions are subjected to extreme temperatures and strongly oxidizing conditions in practice. Only very few dyes have been found which are stable in an environment of this type. Commercial use is made principally of C.I. Direct Blue 199 (C.I. 74190), C.I. Direct Blue 86 (C.I. 74180), C.I. Acid Green 25 (C.I. 61570), C.I. Acid Yellow 73 (C.I. 45350) and uranine (sodium fluoroscein). C.I. Acid Green 25 is generally combined with C.I. Acid Yellow 73 or with uranine, giving a fluorescent green color. C.I. Acid Yellow 221 is frequently also used as yellow dye and C.I. Basic Violet 10 (C.I. 45170) as red dye.

U.S. Pat. No. 5,723,060 (1) describes blue dyes having a 1-amino-4-anilinoanthraquinone structure as colorant for coolant compositions.

U.S. Pat. No. 5,725,794 (2) recommends coolant compositions which comprise polyoxyalkylene-substituted reactive dyes which are said to have improved thermal stability due to the polymer substituents; for example, reactive dyes, such as C.I. Basic Violet 3 or C.I. Reactive Violet 5, are chemically reacted specifically with polyoxyalkyleneamines or with polyoxyethylene-dimethylsiloxane copolymers. EP-B 864 616 (3) likewise teaches a reaction of reactive dyes of this type with polyoxyethylene-dimethylsiloxane copolymers and the use thereof in coolant compositions. Disadvantages in the teaching of (2) and (3) compared with the unsubstituted reactive dyes are, in particular, the additional synthesis step and the lack of commercial availability of such dyes.

From the viewpoint of the automobile industry, a disadvantage of many of the dyes employed in radiator protection compositions is that, due to the slight intentional leakage desired for lubrication of the water pump, they form colored residues of the escaped coolant on the outer metal surface of the water pump, the occurrence of which may give the impression of rust formation or incorrectly be attributed to defective or perished pump gaskets, resulting in unjustified customer complaints.

There is thus a demand for thermally stable dyes which do not form colored residues, but instead at most colorless residues after drying on metal surfaces at leaking points of the cooling system.

Surprisingly, it has now been found that the unsubstituted reactive dye C.I. Reactive Violet 5 (Colour Index No. 18097) not only has excellent thermal stability in coolants, but also, in contrast to other dyes employed in coolants, does not leave colored residues on metal surfaces at leaks in the cooling system.

The present invention thus relates to antifreeze concentrates based on alkylene glycols or derivatives thereof or on glycerol, comprising from 0.0005 to 0.1% by weight, preferably from 0.001 to 0.05% by weight, in particular from 0.002 to 0.02% by weight, of the dye C.I. Reactive Violet 5 (Colour Index No. 18097), based on the total amount of the concentrate.

C.I. Reactive Violet 5 (Colour Index No. 18097) is the copper complex of 5-(acetylamino-)-4-hydroxy-3-[[2-hydroxy-4-[[2-(sulfoxy)ethyl]sulfonyl]phenyl]azo]-2,7-naphthalenedisulfon ic acid. Its CAS registry number is 12226-38-9.

The dye C.I. Reactive Violet 5 is incorporated into the antifreeze concentrate in underivatized form, i.e. in commercially available form. The incorporation is carried out in such a way as to exclude chemical reactions with constituents of the antifreeze concentrate—at least before introduction into the cooling system.

The present invention therefore also relates to a process for the preparation of antifreeze concentrates wherein the dye C.I. Reactive Violet 5 (Colour Index No. 18097) is incorporated into antifreeze concentrates based on alkylene glycols or derivatives thereof or on glycerol in an amount of from 0.0005 to 0.1% by weight, preferably from 0.001 to 0.05% by weight, in particular from 0.002 to 0.02% by weight, based on the total amount of the concentrate. The incorporation is usually carried out before preparation of the ready-to-use aqueous coolant compositions from the concentrates or before introduction of the ready-to-use aqueous coolant compositions into the cooling system.

In a preferred embodiment, the antifreeze concentrates according to the invention comprise the following compounds in addition to the dye:

a) from 0.05 to 5% by weight, based on the total amount of the concentrate, of one or more aliphatic, cycloaliphatic or aromatic monocarboxylic acids, each having from 3 to 16 carbon atoms, in the form of their alkali metal, ammonium or substituted ammonium salts, and/or b) from 0.05 to 5% by weight, based on the total amount of the concentrate, of one or more aliphatic or aromatic di- or tricarboxylic acids, each having from 3 to 21 carbon atoms, in the form of their alkali metal, ammonium or substituted ammonium salts, and/or c) one or more alkali metal borates, alkali metal phosphates, alkali metal silicates, alkali metal nitrites, alkali or alkaline earth metal nitrates, alkali metal molybdates or alkali or alkaline earth metal fluorides, each in amounts of up to 1% by weight, based on the total amount of the concentrate, and/or d) from 0.05 to 5% by weight, based on the total amount of the concentrate, of one or more aliphatic, cycloaliphatic or aromatic amines having from 2 to 15 carbon atoms, which may additionally contain ether oxygen atoms or hydroxyl groups, and/or e) from 0.05 to 5% by weight, based on the total amount of the concentrate, of one or more monocyclic or bicyclic unsaturated or partially unsaturated heterocyclic compounds having from 4 to 10 carbon atoms, which may be benzo-fused and/or may carry additional functional groups, and/or f) from 0.05 to 5% by weight, based on the total amount of the concentrate, of one or more tetra($C_1$–$C_8$-alkoxy) silanes (tetra-$C_1$–$C_8$-alkyl orthosilicates), and/or g) from 0.05 to 10% by weight, based on the total amount of the concentrate, of one or more carboxamides and/or sulfonamides, and/or h) up to 1% by weight, based on the total amount of the concentrate, of one or more hard-water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins.

The compounds from groups a) to g) are generally corrosion inhibitors.

Suitable linear or branched aliphatic or cycloaliphatic monocarboxylic acids a) are, for example, propionic acid, pentanoic acid, hexanoic acid, cyclohexylacetic acid, octanoic acid, 2-ethylhexanoic acid, nonanoic acid, isononanoic acid, decanoic acid, undecanoic acid and dodecanoic acid. Suitable aromatic monocarboxylic acids a) are, in particular, benzoic acid, and also, for example, $C_1$- to $C_8$-alkylbenzoic acids, such as o-, m- and p-methylbenzoic acid and p-tert-butylbenzoic acid, and hydroxyl-containing aromatic monocarboxylic acids, such as o-, m- and p-hydroxybenzoic acid, o-, m- and p-(hydroxymethyl) benzoic acid, and halobenzoic acids, such as o-, m- and p-fluorobenzoic acid.

Typical examples of di- and tricarboxylic acids b) are malonic acid, succinic acid, glutaric acid, adipic acid, pimelic acid, suberic acid, azelaic acid, sebacic acid, undecanedioic acid, dodecanedioic acid, dicyclopentadienedicarboxylic acid, phthalic acid, terephthalic acid and triazinetriiminocarboxylic acids, such as 6,6',6"-(1,3,5-triazin-2,4,6-triyltriimino)trihexanoic acid.

All said carboxylic acids from groups a) and b) are in the form of alkali metal salts, especially as sodium or potassium salts, or in the form of ammonium salts or substituted ammonium salts (amine salts), for example with ammonia, trialkylamines or trialkanolamines.

Typical examples of corrosion inhibitors mentioned under c) are sodium tetraborate (borax), disodium hydrogenphosphate, trisodium phosphate, sodium metasilicate, sodium nitrite, sodium nitrate, magnesium nitrate, sodium fluoride, potassium fluoride, magnesium fluoride and sodium molybdate.

On concomitant use of alkali metal silicates, these are advantageously stabilized by conventional organosilicophosphonates or organosilicosulfonates in conventional amounts.

Suitable aliphatic, cycloaliphatic or aromatic amines d) having from 2 to 15 carbon atoms, preferably from 4 to 8 carbon atoms, which may additionally contain ether oxygen atoms, in particular from 1 to 3 ether oxygen atoms, or hydroxyl groups, in particular from 1 to 3 hydroxyl groups, are, for example, ethylamine, propylamine, isopropylamine, n-butylamine, isobutylamine, sec-butylamine, tert-butylamine, n-pentylamine, n-hexylamine, n-heptylamine, n-octylamine, isononylamine, di-n-propylamine, diisopropylamine, di-n-butylamine, mono-, di- and triethanolamine, piperidine, morpholine, aniline and benzylamine. Aliphatic and cycloaliphatic amines d) are generally saturated.

The heterocyclic compounds e) are, for example, monocyclic 5- or 6-membered systems which have 1, 2 or 3 nitrogen atoms or one nitrogen atom and one sulfur atom and which may be benzo-fused. It is also possible to employ bicyclic systems comprising 5- and/or 6-membered sub-rings, typically having 2, 3 or 4 nitrogen atoms. The heterocyclic compounds e) may additionally carry functional groups, preferably $C_1$–$C_4$-alkoxy, amino and/or mercapto groups. The heterocyclic skeleton may of course also carry alkyl groups, in particular $C_1$–$C_4$-alkyl groups.

Typical examples of heterocyclic compounds e) are benzotriazole, tolutriazole (tolyltriazole), hydrogenated tolutriazole, 1H-1,2,4-triazole, benzimidazole, benzothiazole, adenine, purine, 6-methoxypurine, indole, isoindole, isoindoline, pyridine, pyrimidine, 3,4-diaminopyridine, 2-aminopyrimidine and 2-mercaptopyrimidine.

Suitable tetra($C_1$–$C_8$-alkoxy)silanes f) are, for example, tetramethoxysilane, tetraethoxysilane, tetra-n-propoxysilane and tetra-n-butoxysilane.

The amides g) may, if desired, be substituted on the nitrogen atom of the amide group by alkyl, for example by a $C_1$–$C_4$-alkyl group. Aromatic or heteroaromatic skeletons of the molecule may of course also carry alkyl groups of this type. The molecule may contain one or more, preferably one or two, amide groups. The amides may carry additional functional groups, preferably $C_1$–$C_4$-alkoxy, amino, chlorine, fluorine, hydroxyl and/or acetyl groups; in particular, functional groups of this type are present as substituents on aromatic or heteroaromatic rings present.

Typical examples of carboxamides and sulfonamides of this type in group g) are listed in DE-A 1036 031. In addition to said inhibitor components from groups a) to g), it is also possible to employ soluble magnesium salts of organic acids, for example magnesium benzenesulfonate, magnesium methanesulfonate, magnesium acetate or magnesium propionate, hydrocarbazoles or quaternized imidazoles, as described in DE-A 196 05 509, in conventional amounts as further inhibitors.

Of the additional components mentioned above in the antifreeze concentrates according to the invention, preference is given to carboxylic acids from groups a) and/or b) and/or heterocyclic compounds from group e). In a particularly preferred embodiment, the antifreeze concentrates according to the invention comprise, in addition to the dye, from 0.05 to 5% by weight, in particular from 0.5 to 3% by weight, of each of two carboxylic acids from groups a) and/or b) which are different from one another and from 0.05 to 5% by weight, in particular from 0.1 to 0.5% by weight, of one or more heterocyclic compounds from group e).

These carboxylic acids which are different from one another can be, for example, mixtures of an aliphatic monocarboxylic acid and an aliphatic dicarboxylic acid, of an aromatic monocarboxylic acid and an aliphatic dicarboxylic acid, of an aliphatic monocarboxylic acid and an aromatic monocarboxylic acid, of two aliphatic monocarboxylic acids or of two aliphatic dicarboxylic acids. Suitable heterocyclic compounds to be used concomitantly here are, in particular, benzotriazole and tolutriazole.

The pH of the antifreeze concentrates according to the invention is usually in the range from 4 to 11, preferably from 4 to 10, in particular from 4.5 to 8.5. The desired pH can, if necessary, also be set here by addition of alkali metal hydroxide, ammonia or amines to the formulation; solid sodium hydroxide or potassium hydroxide and aqueous sodium hydroxide solution or potassium hydroxide solution are particularly suitable for this purpose. Carboxylic acids to be used concomitantly are advantageously added directly as corresponding alkali metal salts in order automatically to be in the desired pH range. However, the carboxylic acids can also be added as free acids and then neutralized using alkali metal hydroxide, ammonia or amines and the desired pH range.

Suitable liquid alcoholic freezing point depressants, which normally make up the principal constituent (in general at least 75% by weight, in particular at least 85% by weight) of the antifreeze concentrates according to the invention, are alkylene glycols and derivatives thereof and glycerol, in particular propylene glycol and especially ethylene glycol. However, higher glycols and glycol ethers are also suitable, for example diethylene glycol, dipropylene glycol and monoethers of glycols, such as the methyl, ethyl, propyl and butyl ethers of ethylene glycol, propylene glycol, diethylene glycol and dipropylene glycol. It is also possible to use mixtures of said glycols and glycol ethers and mixtures of these glycols with glycerol and, if desired, these glycol ethers.

In a preferred embodiment, the antifreeze concentrates according to the invention are based on ethylene glycol or propylene glycol or mixtures of alkylene glycols or of glycerol with ethylene glycol or propylene glycol, each of which comprises at least 95% by weight of ethylene glycol and/or propylene glycol and/or glycerol.

As further conventional assistants, the antifreeze concentrates according to the invention may also comprise antifoams (in general in amounts of from 0.003 to 0.008% by weight) and, for reasons of hygiene and safety in the case of ingestion, bitter substances (for example of the denatonium benzoate type).

The present invention also relates to ready-to-use aqueous coolant compositions having a depressed freezing point, in particular for protecting radiators of internal-combustion engines in the automobile sector, which comprise water and from 10 to 90% by weight, in particular from 20 to 60% by weight, of the antifreeze concentrates according to the invention.

The following examples are intended to illustrate the invention, but without representing a restriction.

EXAMPLES

The experiments were carried out using a commercially available antifreeze concentrate based on ethylene glycol with a mixture of adipic acid, sebacic acid and tolutriazole as inhibitor components.

Differently colored samples were prepared by addition of 50 ppm of the respective dye to this concentrate and mixing thoroughly.

Two drops of uncolored concentrate, two drops of the formulation according to the invention containing the dye C.I. Reactive Violet 5 and two drops of comparative samples prepared with other dyes were applied with the aid of a glass pipette to an aluminum plate (alloy GA(10 mg, diameter 70 mm, thickness 6 mm). Each aluminum plate was placed on an electric hotplate (IKA-Combimag RCT, 600 W, from Janke & Kunkel/Staufen) and heated for 5 minutes. The evaporated residue was then assessed visually in each case. The results from the hotplate test are shown in Table 1. They show that, on use of the dye C.I. Reactive Violet 5 and in the case of the uncolored concentrate, a white residue occurred, while in the case of the use of other dyes, undesired colored residues were formed on the metal surface.

Tables 2 and 3 show the good results of a formulation according to the invention containing 50 ppm of C.I. Reactive Violet 5 in the glassware corrosion test in accordance with ASTM D 1384-97 and in the heat transfer corrosion test in accordance with ASTM D 4340. The tests also showed that the dye was stable in the formulation, even on heating, and no decoloration of the radiator protection composition was observed.

TABLE 1

Hotplate test

| Dye | C.I. No. | CAS No. | Added [ppm] | Test result |
|---|---|---|---|---|
| None | — | — | — | White residue |
| C.I. Reactive Violet 5 | 18097 | 12226-38-9 | 50 | White residue |
| C.I. Basic Violet 10 | 45170 | 81-88-9 | 50 | Red residue |
| C.I. Acid Green 25 | 61570 | 4403-90-1 | 50 | Pale green residue |
| C.I. Acid Yellow 221 | | 61814-59-3 | 50 | Yellowish residue |
| C.I. Acid Yellow 73 | 45350 | 518-47-8 | 50 | Yellow-brown residue |
| C.I. Direct Blue 86 | 74180 | 1330-38-7 | 50 | Blue-green residue |
| C.I. Basic Violet 1 | 42535 | 8004-87-3 | 50 | Blue residue |
| C.I. Basic Violet 3 | 42555 | 548-62-9 | 50 | Blue residue |

TABLE 2

Glassware corrosion test in accordance with ASTM D 1384-97
Antifreeze concentrate containing 50 ppm of C.I. Reactive Violet 5; concentration: 33% by volume

| Metal alloys: | Weight changes [mg/cm$^2$] |
|---|---|
| | +0.03 |
| Soft solder | +0.07 |
| Brass | +0.03 |
| Steel | +0.03 |
| Gray iron | +0.08 |
| Cast aluminum | −0.02 |

Appearance of solution before test: violet, clear
Appearance of solution after test: violet, clear

TABLE 3

Heat transfer corrosion test in accordance with ASTM D 4340
Antifreeze concentrate containing 50 ppm of C.I. Reactive Violet 5; concentration: 25% by volume

| Metal alloy: | Weight changge [mg/cm$^2$/week] |
|---|---|
| Cast aluminum | +0.36 | i) Appearance of solution before test: violet, clear
j) Appearance of solution after test: violet, clear

We claim:
1. An antifreeze concentrate based on alkylene glycols or derivatives thereof or on glycerol, comprising from 0.0005 to 0.1% by weight of the dye C.I. Reactive Violet 5 (Colour Index No. 18097), based on the total amount of the concentrate.

2. An antifreeze concentrate as claimed in claim 1, comprising, in addition to the dye, the following compounds:
   a) from 0.05 to 5% by weight, based on the total amount of the concentrate, of one or more aliphatic, cycloaliphatic or aromatic monocarboxylic acids, each having from 3 to 16 carbon atoms, in the form of their alkali metal, ammonium or substituted ammonium salts, and/or
   b) from 0.05 to 5% by weight, based on the total amount of the concentrate, of one or more aliphatic or aromatic di- or tricarboxylic acids, each having from 3 to 21 carbon atoms, in the form of their alkali metal, ammonium or substituted ammonium salts, and/or
   c) one or more alkali metal borates, alkali metal phosphates, alkali metal silicates, alkali metal nitrites, alkali or alkaline earth metal nitrates, alkali metal molybdates or alkali or alkaline earth metal fluorides, each in amounts of up to 1% by weight, based on the total amount of the concentrate, and/or
   d) from 0.05 to 5% by weight, based on the total amount of the concentrate, of one or more aliphatic, cycloaliphatic or aromatic amines having from 2 to 15 carbon atoms, which may additionally contain ether oxygen atoms or hydroxyl groups, and/or
   e) from 0.05 to 5% by weight, based on the total amount of the concentrate, of one or more monocyclic or bicyclic unsaturated or partially unsaturated heterocyclic compounds having from 4 to 10 carbon atoms, which may be benzo-fused and/or may carry additional functional groups, and/or
   f) from 0.05 to 5% by weight, based on the total amount of the concentrate, of one or more tetra($C_1$–$C_8$-alkoxy) silanes (tetra-$C_1$–$C_8$-alkyl orthosilicates), and/or
   g) from 0.05 to 10% by weight, based on the total amount of the concentrate, of one or more carboxamides and/or sulfonamides, and/or
   h) up to 1% by weight, based on the total amount of the concentrate, of one or more hard-water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins.

3. An antifreeze concentrate as claimed in claim 2, comprising, in addition to the dye, from 0.05 to 5% by weight of each of two carboxylic acids from groups a) and/or b) which are different from one another and from 0.05 to 5% by weight of one or more heterocyclic compounds from group e).

4. An antifreeze concentrate as claimed in claim 1 having a pH in the range from 4 to 11.

5. An antifreeze concentrate as claimed in claim 2 having a pH in the range from 4 to 11.

6. An antifreeze concentrate as claimed in claim 1 based on ethylene glycol or propylene glycol or mixtures of alkylene glycols or on glycerol with ethylene glycol or propylene glycol, in each case comprising at least 95% by weight of ethylene glycol and/or propylene glycol and/or glycerol.

7. An antifreeze concentrate as claimed in claim 2 based on ethylene glycol or propylene glycol or mixtures of alkylene glycols or on glycerol with ethylene glycol or propylene glycol, in each case comprising at least 95% by weight of ethylene glycol and/or propylene glycol and/or glycerol.

8. A process for the preparation of an antifreeze concentrate as claimed in claim 1, wherein the dye C.I. Reactive Violet 5 (Colour Index No. 18097) is incorporated in an amount of from 0.0005 to 0.1% by weight, based on the total amount of the concentrate, into an antifreeze concentrate based on alkylene glycols or derivatives thereof or on glycerol.

9. A process for the preparation of an antifreeze concentrate as claimed in claim 2, wherein the dye C.I. Reactive Violet 5 (Colour Index No. 18097) is incorporated in an amount of from 0.0005 to 0.1% by weight, based on the total amount of the concentrate, into an antifreeze concentrate based on alkylene glycols or derivatives thereof or on glycerol.

10. A ready-to-use aqueous coolant composition having a lowered freezing point which comprises water and from 10 to 90% by weight of an antifreeze concentrate as claimed in claim 1.

11. A ready-to-use aqueous coolant composition having a lowered freezing point which comprises water and from 10 to 90% by weight of an antifreeze concentrate as claimed in claim 2.

12. A process for the preparation of aqueous coolant compositions for internal-combustion engines, which comprises using an antifreeze concentrate as claimed in claim 1 for this purpose.

13. A process for the preparation of aqueous coolant compositions for internal-combustion engines, which comprises using an antifreeze concentrate as claimed in claim 2 for this purpose.

* * * * *